Figure 1:
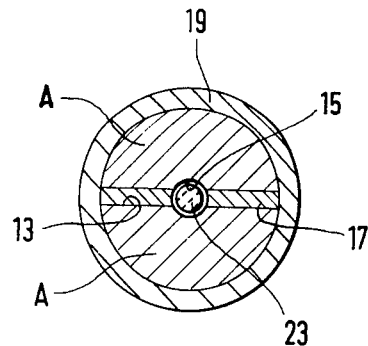

United States Patent [19]

Lewis et al.

[11] 4,261,774
[45] Apr. 14, 1981

[54] METHODS OF TERMINATING OPTICAL FIBRE CABLES

[75] Inventors: Edward L. Lewis, Maidstone; Jan R. Syska, Cannock, both of England

[73] Assignee: Elliott Brothers (London) Limited, Chelmsford, England

[21] Appl. No.: 48,263

[22] Filed: Jun. 13, 1979

[30] Foreign Application Priority Data

Jun. 19, 1978 [GB] United Kingdom ............... 27277/78

[51] Int. Cl.³ .................. B29C 27/00; B32B 31/00; G02B 5/14; G02B 5/16
[52] U.S. Cl. ........................... 156/86; 156/85; 350/96.21; 350/96.22
[58] Field of Search ............... 156/84, 85, 86; 174/74 A; 350/96.21, 96.22, 96.2

[56] References Cited

U.S. PATENT DOCUMENTS

| | | | |
|---|---|---|---|
| 3,150,231 | 9/1964 | Clark | 174/88 C |
| 3,455,625 | 7/1969 | Brumley et al. | 350/96.22 |
| 3,912,362 | 10/1975 | Hudson | 350/96.2 |
| 3,914,015 | 10/1975 | McCartney | 350/96.22 |
| 3,999,837 | 12/1976 | Bowen et al. | 350/96.22 |
| 4,043,854 | 8/1977 | LeNoane et al. | 350/96.22 |
| 4,116,655 | 9/1978 | Lewis | 350/96.22 |

FOREIGN PATENT DOCUMENTS

1465493  2/1974  United Kingdom ............... 350/96.22

*Primary Examiner*—John T. Goolkasian
*Assistant Examiner*—Louis Falasco
*Attorney, Agent, or Firm*—Kirschstein, Kirschstein, Ottinger & Cobrin

[57] ABSTRACT

A method of terminating an optical fibre cable wherein an annular deformable member is compressed inwardly onto a cable threaded through it by causing an encircing cincture exhibiting 'memory' properties to try to return to a remembered shape and size. The annular member includes a plurality of portions which are held apart by spacer material to define a passageway through which the cable is threaded, the spacer material being subsequently caused to deform e.g. by heating, so that under the force exerted by the cincture said portions are urged inwardly and grip the cable.

8 Claims, 3 Drawing Figures

U.S. Patent     Apr. 14, 1981     4,261,774

METHODS OF TERMINATING OPTICAL FIBRE CABLES

This invention relates to methods of terminating optical fibre cables.

In arrangements making use of optical fibre cables it is generally convenient for the cables to be in manageable lengths provided with terminations whereby the lengths may be coupled together or to associated devices which the cables serve to interconnect.

Whilst various methods of terminating optical fibre cables have been proposed there is always a difficulty in obtaining a satisfactory compromise between the need to provide a termination which is sound mechanically and in respect of light transmission, and the desirability of providing a termination which can easily be fabricated in the field.

It is an object of the present invention to provide a method of terminating an optical fibre cable which alleviates this difficulty and is especially suitable for use with cables comprising a single optical fibre.

According to the invention a method of terminating an optical fibre cable comprises inserting the cable into the passageway through an annular composite member including a plurality of portions held apart by spacer material so that said passageway is appreciably oversize in relation to the cross-section of the cable and causing a cincture of material exhibiting shape and size memory properties which encircles said composite member to try to return to a remembered shape and size and thereby exert a force on the composite member so that said spacer material is deformed and said portions are urged inwardly by the force exerted by the cincture and grip the cable.

In a preferred method in accordance with the invention the cincture is first subjected to a treatment which causes it to try to return to its remembered size and shape and thereby exert a compressive force on the composite member and subsequently the spacer material is subjected to a treatment which allows it to deform under the force exerted by the cincture.

The treatments to which the cincture and spacer material are subjected are preferably heat treatments.

Preferably the cincture heat treatment comprises raising its temperature above a critical temperature below the lowest required operating temperature of the termination and the spacer material heat treatment comprises raising its temperature above the highest required operating temperature of the termination.

The cable may comprise a single optical fibre or a bundle of two or more optical fibres.

In one particular method where the spacer material is subjected to a heat treatment to allow it to deform, the spacer material is a heat softenable material which under the force exerted by the cincture flows into contact with the surface of the cable and adheres thereto.

Figure 2:
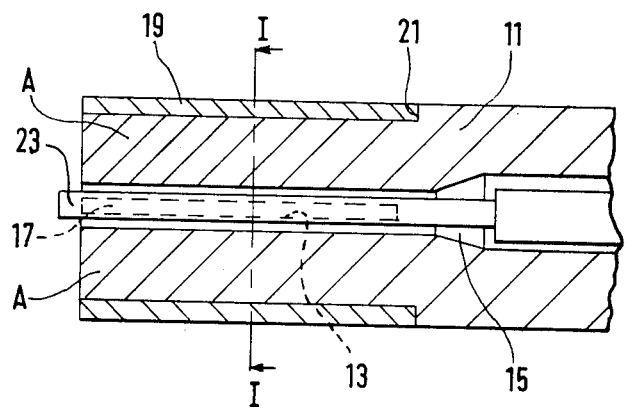
Figure 3:
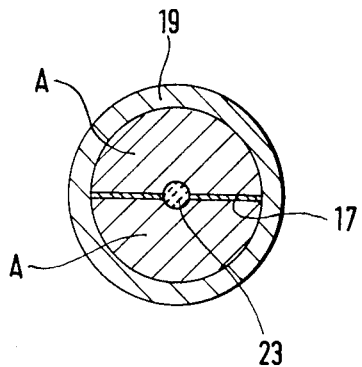

One method in accordance with the invention will now be described by way of example with reference to the accompanying drawings in which:

FIGS. 1 and 2 are respectively diagrammatic cross sectional and longitudinal sectional views illustrating a first stage in the method; and FIG. 3 is a cross sectional view, corresponding to FIG. 1 but illustrating a second stage in the method.

The method makes use of an annular composite member and a cincture.

Referring to FIGS. 1 and 2, the composite member includes a split collet 11 of generally tubular form with a diametrical slot 13 extending part way along its length from one end, and an axial bore 15 which enlarges slightly beyond the slot 11. On either side of the axial bore 15 the slot 13 is filled with a heat softenable spacer material 17.

The cincture is in the form of a metal sleeve 19 which fits on the slotted part of the collet 11, the sleeve 19 locating on a shoulder 21.

The sleeve 19 consists of a metal alloy, known per se, such as a brass-aluminium alloy or a nickel-titanium alloy which exhibits shape and size memory properties so that if deformed at a temperature below a critical temperature, determined by the alloy composition, the sleeve 19 will try to return to its original shape and size when raised above the critical temperature.

For use in forming a particular termination an alloy is chosen whose critical temperature is below the lowest temperature at which the termination is required to operate, and the sleeve 19 is initially formed with an internal diameter appreciably smaller than the external diameter of the collet 11. The temperature of the sleeve 19 is then reduced below the critical value and the sleeve 19 is mechanically expanded so that it is a sliding fit on the collet 11. The sleeve 19 is then slid onto the collet 11 and raised to a temperature, e.g. room temperature above the critical value so that it tries to contract and exerts a compressive force on the collet 11, thereby securing the sleeve 19 on the collet 11.

The spacer material 17 serves to hold apart the portions A of the collet 11 on either side of the slot 13 against the compressive force exerted by the sleeve 19.

To terminate a single fibre cable the end of the optical fibre 23 is first prepared as necessary, e.g. by squaring off the end of the fibre and stripping back the outer protective sheath. The end of the fibre 23 is then inserted into the bore 15 in the collet 11 from its wider end. The assembly is then heated sufficiently to soften the spacer material 17 whereupon, under the force exerted by the sleeve 19, the material 17 deforms and the portions A of the collet 11 on either side of the slot 13 are pushed inwardly to grip the fibre 23 between them (see FIG. 3).

The termination is completed by grinding and polishing or cleaving the end of the fibre 23.

Heat is conveniently applied to the assembly by means of a tool in the form of an apertured block (not shown) which receives the assembly and transfers heat thereto by conduction.

The amount of compression applied by the sleeve 19 is just sufficient to cause the fibre 23 to be securely gripped without being crushed. The degree of compression is controlled by suitably choosing the dimensions, initial expansion and critical temperature of the sleeve 19.

It will be appreciated that during deformation the spacer material 17 flows at least to a limited extent and fills any available space between the fibre 23 and collet 11, excess material being squeezed out of the end of the collet 11 and along the axial bore 15. It will thus be appreciated that the parts of the collet 11 pressed inwardly may or may not contact the fibre directly.

To make a more secure termination the spacer material 17 may be chosen so as to adhere to the fibre 23 and/or the collet 11 after softening and cooling. To this end the fibre 23 may be provided, for example, by electroless deposition, with a coating (not shown) to which the spacer material 17 will readily adhere. With plastic sheathed fibres the sheath is preferably removed before coating.

Typical spacer materials are plastics materials, such as nylon, adhesive materials and low melting point alloys such as solder. Typical materials for the collet are brass and stainless steel.

It will be appreciated that since the insertion of the optical fibre 23 into the composite member and heating of the spacer material 17 are relatively easy steps and can be carried out at a different location from the earlier steps and at any desired time after the earlier steps, the method is particularly adapted for use in the fabrication of terminations by unskilled labour in the field.

The method described may also be used with cables comprising two or more fibres but it is not satisfactory for use where the fibres are smaller than the slot 13 in the collet 11.

We claim:

1. A method of terminating an optical fibre cable comprising inserting the cable into the passageway through an annular composite member including at least two portions held apart by pressure deformable spacer material so that said passageway is appreciably oversize in relation to the cross-section of the cable and causing a cincture of material exhibiting shape and size memory properties which encircles said composite member to try to return to a remembered smaller shape and size and thereby exert a constricting force on the composite member so that said spacer material is deformed and said portions are urged inwardly by the force exerted by the cincture and grip the cable.

2. A method according to claim 1 wherein the cincture is first subjected to a treatment which causes it to try to return to its remembered size and shape and thereby exert a compressive force on the composite member and subsequently the spacer material is subjected to a treatment which allows it to deform under the force exerted by the cincture.

3. A method according to claim 2 wherein the treatments to which the cincture and spacer material are subjected are heat treatments.

4. A method according to claim 3 wherein the cincture heat treatment comprises raising its temperature above a critical temperature below the lowest required operating temperature of the termination and the spacer material heat treatment comprises raising its temperature above the highest required operating temperature of the termination.

5. A method according to claim 1 wherein the composite member includes a tubular member having a diametrical slot extending part-way along its length from one end, the parts of the tube on either side of the slot constituting said portions.

6. A method according to claim 1 wherein the spacer material is subjected to a heat treatment to allow it to deform and is a heat softenable material which under the force exerted by the cincture flows into contact with the surface of the cable and adheres thereto.

7. A method according to claim 6 wherein said cable is provided with a surface coating to facilitate adherence of said spacer material.

8. A method according to any preceding claims wherein the cincture consists of an alloy of nickel and titanium.

* * * * *